United States Patent

Schuyler et al.

[11] Patent Number: 4,760,978
[45] Date of Patent: Aug. 2, 1988

[54] ICE-FREE SCREEN FOR PROTECTING ENGINES FROM DAMAGE CAUSED BY FOREIGN BODIES IN THE INTAKE AIRSTREAM

[75] Inventors: Martin Schuyler, Hastings-on-Hudson; John L. Cox, II, Somers, both of N.Y.

[73] Assignee: Cox & Company, Inc., New York, N.Y.

[21] Appl. No.: 932,633

[22] Filed: Nov. 19, 1986

[51] Int. Cl.⁴ .............................................. B64D 15/12
[52] U.S. Cl. ................ 244/134 D; 244/53 B; 60/39.093
[58] Field of Search ............. 55/267, 306; 60/39.092, 60/39.093; 219/202, 219, 528, 529, 532, 548, 549, 552, 553; 244/134 R, 134 D, 53 B

[56] References Cited

U.S. PATENT DOCUMENTS

| 787,047 | 4/1905 | Leonard . | |
| 2,129,046 | 9/1938 | Clay | 219/553 |
| 2,507,018 | 5/1950 | Jewett et al. | 60/39.093 |
| 3,022,412 | 2/1962 | Waters | 244/134 D |
| 3,204,084 | 8/1965 | Spencer, Jr. et al. | 219/202 |
| 3,798,417 | 3/1974 | Bittner | 219/552 |
| 4,250,703 | 2/1981 | Norris et al. | 244/53 B |

FOREIGN PATENT DOCUMENTS 2533936 7/1975 Fed. Rep. of Germany .

*Primary Examiner*—Galen Barefoot
*Attorney, Agent, or Firm*—Mark H. Jay

[57] ABSTRACT

A plurality of electrically conductive wires is connected between two terminals and cross over each other at crossover points. Wire segments connect adjacent crossover points. All such adjacent connected crossover points have different potentials when a voltage is connected between the terminals. This forms a screen which protects an engine from damage caused by foreign objects carried into the engine intake. When a power source is connected to the terminals, the screen is heated to prevent the accretion of ice.

4 Claims, 3 Drawing Sheets

ICE-FREE SCREEN FOR PROTECTING ENGINES FROM DAMAGE CAUSED BY FOREIGN BODIES IN THE INTAKE AIRSTREAM

BACKGROUND OF THE INVENTION

The invention relates to screens, and more particularly to screens used to cover inlets of engines and like apparatus. More specifically, the invention relates to heated screens which are used to protect aircraft engines from damage caused by large foreign bodies in the intake air.

Foreign bodies drawn into an aircraft engine along with the intake air can pose a substantial threat of engine failure. For example, a large bird or another foreign body drawn into an engine together with intake air can produce severe engine damage.

Screens have therefore been provided in engine inlets, to prevent harmfully large foreign bodies from being carried into the engine. The mesh size of the screen is chosen such that foreign bodies which can pass through the screen are unlikely to cause damage.

Screens of this type work well in non-icing conditions, i.e. when water content of the air, temperature, airspeed, etc. are such that ice does not accrete on the aircraft. However, in icing conditions, a screen of this type can itself be a source of foreign body engine damage.

In icing conditions, ice builds up on screens as now constructed. The ice accretion can be substantial enough to seriously restrict air flow. Furthermore, ice chunks may grow until the forces exerted on them by vibration and the intake air break them off the screen. These chunks, which can reach a dangerously large size, may then be drawn into the engine and can damage it. Also, accreted ice may be released from the screen if the aircraft enters warmer air where the temperature is above freezing.

One object of the invention is to provide a screen—for use with engines and like apparatus—on which ice cannot form.

Another object is to provide such a screen which is heated uniformly across its surface.

Still another object is to provide a screen which is rigid enough to stand up in use while remaining ice free.

A further object is to improve on known screens of this type.

In accordance with the invention, a screen is formed of like electrically conductive wires, each extending between two terminals (to which a power source may be connected). The wires cross each other at crossover points. The wires are arranged—i.e. the crossover points are selected—such that when the terminals are connected across a power source (a) all wires which cross a particular crossover point have the same potential at that crossover point and (b) all crossover points along any given wire have different potentials. Thus, when current is passed through the screen, it passes throughout the entire network of wires, with each wire carrying essentially the same current. Accordingly, all parts of the screen are equally heated.

In the preferred embodiment, the wires are uninsulated and are connected at the crossover points, as by spot welding, brazing, etc. This has no electrical consequences; because the wires are at equipotential at the crossover points (even if they do not touch each other at those points), no current flows from one wire to another. However, the connection is preferred because the screen is more rigid with these connections than without them.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

Figure 1:
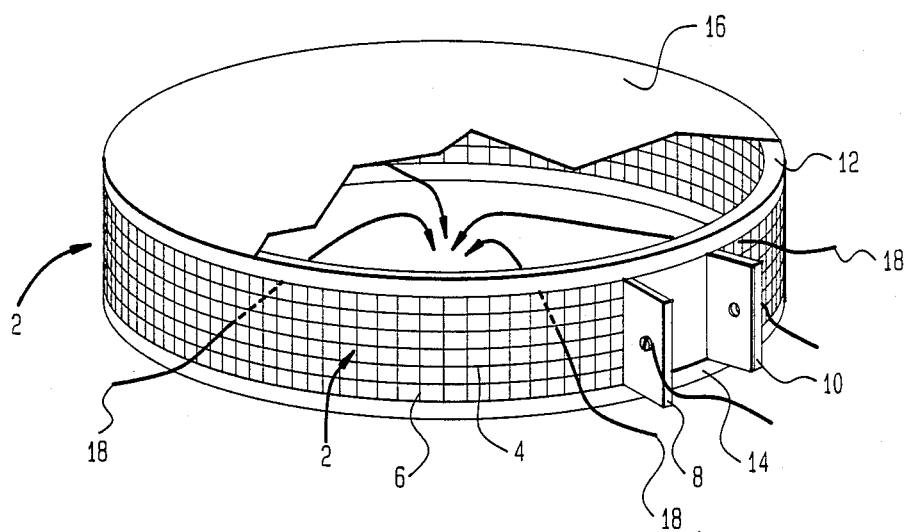
FIG. 1 illustrates a known heated screen for use with an aircraft engine.

FIG. 1 illustrates a problem which must be solved to make an electrically heated screen which is heated evenly over its entire surface. The screen 2 as illustrated is known by itself, and the terminals 8 and 10 have been added for purposes of explanation. As shown, the screen 2 is formed by a plurality of warp wires 4 and weft wires 6 which cross each other at right angles, to form a rectangular pattern. (FIG. 1 is not to scale, and a reduced number of wires has been shown for clarity.) The wires 4, 6 are uninsulated and are assumed to be of electrically conductive material, for example copper-clad stainless steel. The screen 2 is cylindrical in this example, but this is not necessary. The wire may be stainless steel or nickel plated or otherwise made resistant to attack.

An electrical terminal 8 is connected to one end of all of the warp wires 4 and a like electrical terminal 10 is connected to the other end of all of the warp wires 4. Two insulated ring-shaped frames 12 and 14 hold the mesh in the desired cylindrical shape.

The frame 14 is attached to, e.g., an engine inlet (not shown) or some other fixed part of an aircraft upstream of the intake of the engine (not shown). A circular cover plate 16 is attached to the frame 12 to block air from entering the engine otherwise than through the spaces between the wires 4, 6. Intake air, generally following flow paths such as are indicated by reference numerals 18, is drawn between the wires 4, 6 of the screen 2 and into the engine. The spacing of the wires 4, 6 is chosen such that bodies which pass through the screen 2 into the engine are unlikely to be large enough to severely harm the engine.

In icing conditions, ice forms on the screen even when a voltage is established between terminals 8 and 10 and current is passed through the screen 2. The formation of ice is illustrated in FIG. 2, and explained with reference to FIG. 3.

Figure 2:
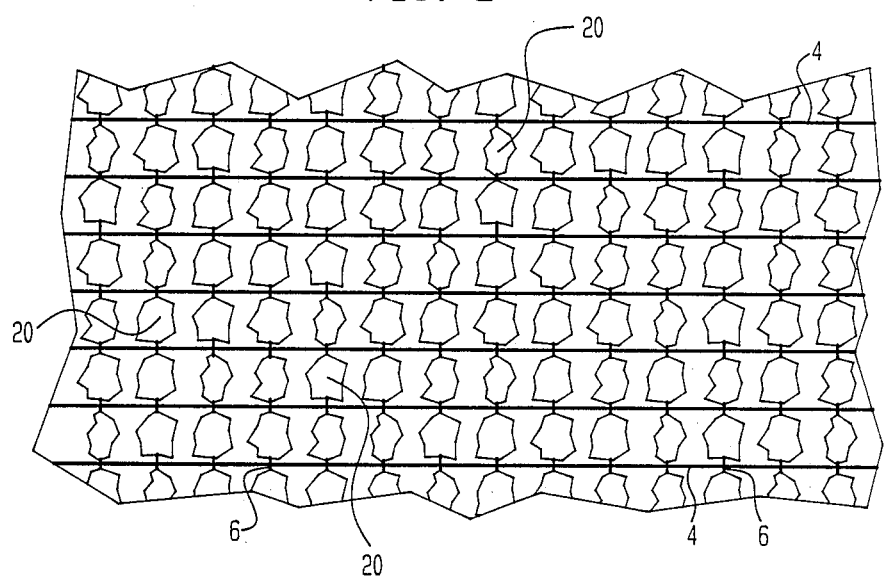
FIG. 2 illustrates ice accretion on the screen of FIG. 1.

As is shown in FIG. 2, ice chunks 20 accrete on the weft wires 6, intermediate the warp wires 4. When the ice chunks 20 become large enough, they can merge with adjacent ones, and can become large enough so that they pose the threat of engine damage when they are broken off the screen or are released from it.

Figure 3:
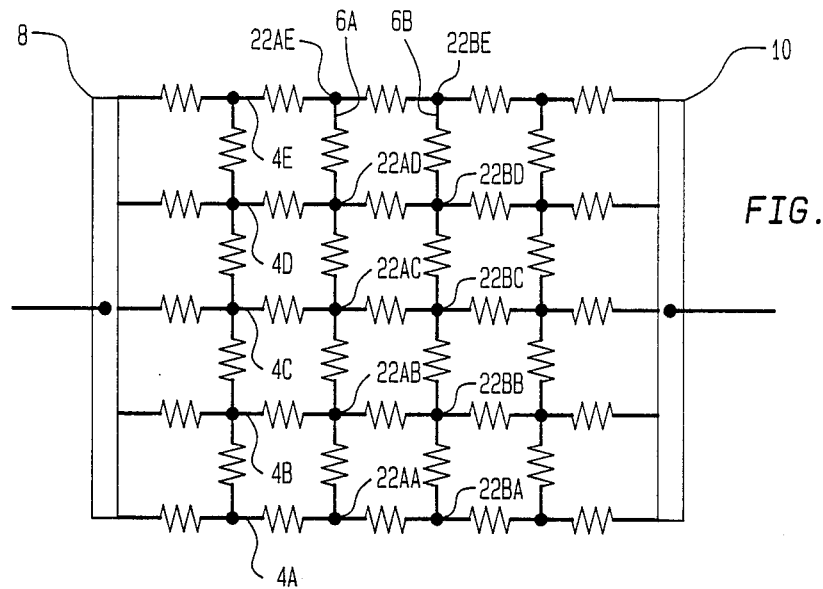
FIG. 3 is a simplified schematic diagram of the electrical characteristics of the screen of FIG. 1.

This accretion takes place because, as will become clear in connection with FIG. 3, no current passes through the weft wires 6. Since the wires 4, 6 are all the same and form a regular pattern, the electrical circuit between the terminals 8 and 10 can be regarded as a rectangular pattern of nodes connected together by unit resistors. Each node is located at the crossover point of a warp wire 4 with a weft wire 6, and each wire segment between two crossover points is as long as all the others.

This circuit is illustrated in schematic fashion in FIG. 3. (FIG. 3 is not to scale; most of the wires 4, 6 have been eliminated for clarity.) As is shown there, warp wires 4A, 4B, 4C, 4D and 4E touch weft wires 6A and 6B. Crossover points 22 are formed wherever a warp wire 4 touches a weft wire 6; crossover point 22BA is where weft wire 6B touches warp wire 4A, crossover point 22AE is where weft wire 6A touches warp wire 4E, and so forth.

Considering the circuit formed by warp wire 4E, i.e. the circuit extending between terminals 8 and 10 which passes through crossover points 22AE and 22BE, it can be seen that one-fifth of the voltage difference across the terminals 8 and 10 will be divided between each of the wire segments of the warp wire 4E. The same holds true for the circuit formed by warp wire 4; one-fifth of the voltage across the terminals 8 and 10 is divided between each of the wire segments of the warp wire 4D.

Therefore, when the screen is connected in circuit with a power source, the crossover points 22AE and 22AD are at equipotential, as are the crossover points 22BD and 22BE. As a result, no current flows between e.g. the crossover points 22AE and 22AD, even though these two crossover points are connected together by a conductive wire segment. The same holds true for all wire segments in weft wires 6A and 6B.

Put another way, current does not pass evenly through the screen 2 because no current passes through the weft wires 6. This in turn happens because the weft wires 6 extend along lines of equipotential in the electrical network formed by the warp wires 4 in the screen 2. As long as wire segments along the weft wires 6 extend between crossover points which are at equipotential, those wire segments will not carry current and will constitute cold segments on which ice can form even when the screen 2 is energized by a power source.

Figure 4:
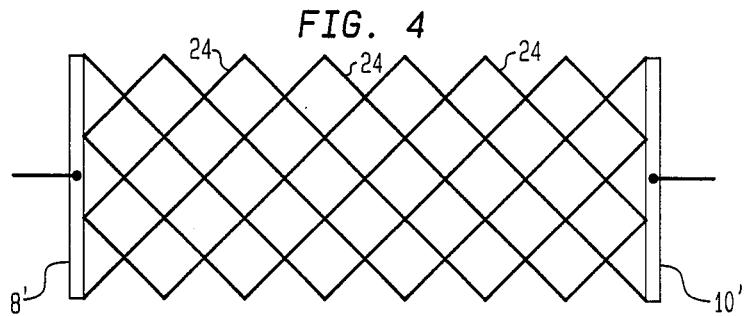
FIG. 4 is a simplified illustration of a preferred embodiment of the invention.

In accordance with the invention, the electrical network formed by the wires is rearranged such that each wire carries essentially the same current and no wire segment connects two crossover points which are at or substantially at equipotential. A preferred embodiment of the invention will now be explained with reference to FIGS. 4, 5 and 6.

In this preferred embodiment, there are actually two screens connected in parallel across two diametrically opposed terminals 8' and 10'. This arrangement is preferred because there is less chance of shorting out the power source (not shown) by inadvertently connecting the terminals 8' and 10' (as by a screwdriver). Only one of these screens will be described, since they are identical.

In this preferred embodiment, there are neither warp wires nor weft wires. Rather, there is a plurality of wires 24 which make regular zig-zag patterns across the screen. In the embodiment illustrated, the wires 24 make right-angled zig-zags, but this is not necessary; these zig-zags can be more acute or more obtuse. Furthermore, it is not necessary that the wires 24 actually be continuous; a conventional welded right-angled screen, cut on the bias, will produce a pattern of conductors such as that shown in FIG. 4.

Figure 5:
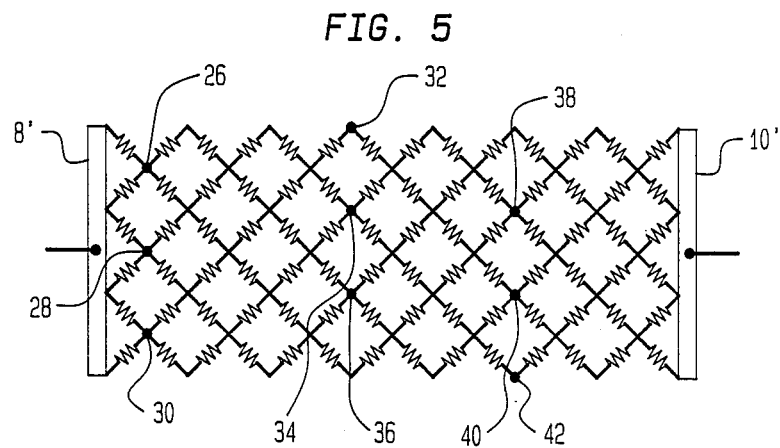
FIG. 5 is a simplified schematic diagram of the electrical characteristics of the preferred embodiment of the invention.

The equivalent circuit shown in FIG. 5 of the preferred embodiment shows that no two crossover points along the same wire are at the same potential. Rather, crossover points which are at the same potential (e.g. crossover points 26, 28, and 30, crossover points 32, 34, and 36, and crossover points 38, 40, and 42) have no direct connection to each other. Furthermore, at each crossover point of two wires 24 (see FIG. 4), the wires 24 are at the same potential (whether they touch each other or not). This is because the resistivity (resistance per unit length) of the wires 24 is constant and the wire lengths from each crossover point to one of the terminals 8' or 10' are always identical.

Figure 6:
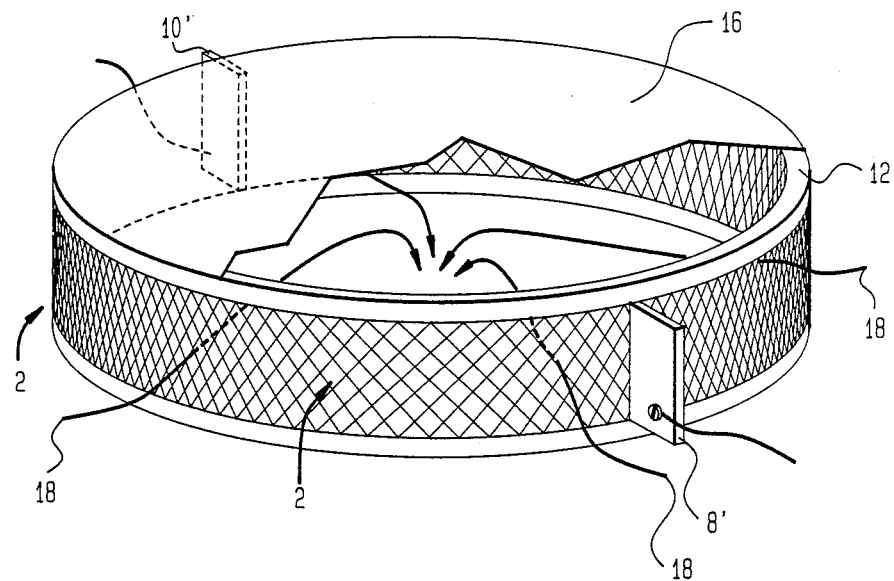
FIG. 6 illustrates a preferred embodiment of the invention.
Figure 7:
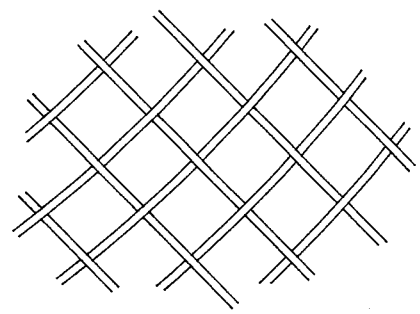
FIG. 7 illustrates one arrangement of wires in the preferred embodiment.
Figure 8:
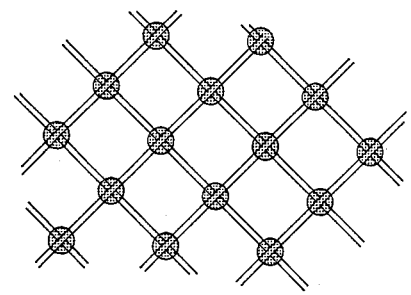
FIG. 8 illustrates another arrangement of wires in the preferred embodiment.

The preferred embodiment is illustrated in perspective view in FIG. 6. The wires in it may be interwoven (FIG. 7) or laid one on another and connected together as by soldering, spot welding, etc. (FIG. 8). The spacing of the wires is not a part of the invention; it is chosen in accordance with the application desired. The wires must be undeformed by forces exerted by the intake air, and must be strong enough to prevent breakage when struck by foreign objects. As illustrated, the wires used all have equal and constant resistance per unit length. This is not a requirement, but is preferred because it is convenient, in that the pattern of the wires is everywhere the same. However, it is alternatively possible to vary the mesh of the screen, and also to use wires of varying resistivity to correspond with varying requirements for heat.

It is not necessary for the wires 24 to make electrical contact with each other. This is because the configuration of the wires 24 is such that no current flows from one wire to another; connections between wires 24 have no electrical function and serve only to make the screen more rigid.

Those skilled in the art will understand that the wires 24 will seldom be so uniform that they are at precise equipotential at crossover points; there may be some small current flow between wires 24. However, this flow will in practice be so small - with respect to current in each of the wires 24—that it can be disregarded.

Although a preferred embodiment has been described above, the scope of the invention is limited only by the following claims:

We claim:

1. A heated screen for use with engine inlets and similar apparatus, comprising:
   first and second terminals; and
   a plurality of uninsulated and electrically conductive wires which are each of which each individual one is connected between the terminals and are physically connected to one another all the other wires at crossover points to create a plurality of wire segments which extend from one crossover point to an adjacent crossover point along a common wire, all crossover points which are connected by wire segments being at different potentials when the terminals are connected across a power source, and the screen being sufficiently rigid that it remains essentially undeformed by intake air.

2. The screen of claim 1, wherein the wires are interwoven.

3. The screen of claim 1, wherein the wires are overlaid.

4. The screen of claim 1, wherein the wires have a constant resistance per unit length.

* * * * *

UNITED STATES PATENT AND TRADEMARK OFFICE
CERTIFICATE OF CORRECTION

PATENT NO. : 4,760,978

DATED : AUGUST 2, 1988

INVENTOR(S) : MARTIN SCHUYLER and JOHN L. COX, II

It is certified that error appears in the above-identified patent and that said Letters Patent is hereby corrected as shown below:

Claim 1 should read as follows:

1. A heated screen for use with engine inlets and similar apparatus, comprising:

first and second terminals; and a plurality of uninsulated and electrically conductive wires of which each individual one is connected between the terminals and physically connected to all the other wires at crossover points to create a plurality of wire segments which extend from one crossover point to an adjacent crossover point along a common wire, all crossover points which are connected by wire segments being at different potentials when the terminals are connected across a power source, and the screen being sufficiently rigid that it remains essentially undeformed by intake air.

Signed and Sealed this

Third Day of January, 1989

Attest:

DONALD J. QUIGG

Attesting Officer

Commissioner of Patents and Trademarks